United States Patent
Kim et al.

(10) Patent No.: US 12,036,921 B2
(45) Date of Patent: Jul. 16, 2024

(54) VEHICLE AND CONTROLLING METHOD USING IRIS AUTHENTICATION

(71) Applicants: Hyundai Motor Company, Seoul (KR); Kia Corporation, Seoul (KR)

(72) Inventors: Taeseung Kim, Incheon (KR); Dong June Song, Gyeonggi-Do (KR); Jihye Lee, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 355 days.

(21) Appl. No.: 17/493,473

(22) Filed: Oct. 4, 2021

(65) Prior Publication Data
US 2022/0114362 A1 Apr. 14, 2022

(30) Foreign Application Priority Data
Oct. 8, 2020 (KR) .................... 10-2020-0130432

(51) Int. Cl.
| | |
|---|---|
| *B60Q 3/80* | (2017.01) |
| *B60R 25/20* | (2013.01) |
| *B60R 25/25* | (2013.01) |
| *B60W 50/00* | (2006.01) |
| *G06V 20/59* | (2022.01) |
| *G06V 40/16* | (2022.01) |
| *G06V 40/18* | (2022.01) |

(52) U.S. Cl.
CPC .............. *B60Q 3/80* (2017.02); *B60R 25/209* (2013.01); *B60R 25/255* (2013.01); *B60W 50/0098* (2013.01); *G06V 20/59* (2022.01); *G06V 40/172* (2022.01); *G06V 40/197* (2022.01); *B60W 2050/0083* (2013.01)

(58) Field of Classification Search
CPC ....... B60Q 3/80; B60R 25/209; B60R 25/255; B60R 16/037; B60R 25/02; B60R 25/04; B60R 25/305; B60R 2025/1013; B60W 50/0098; B60W 2050/0083; B60W 2040/0809; B60W 2420/42; G06V 20/59; G06V 40/172; G06V 40/197; G06V 40/18; B60K 35/00; B60K 2370/52; B60N 2/02; G60K 2370/152
See application file for complete search history.

(56) References Cited

U.S. PATENT DOCUMENTS

| | | | | |
|---|---|---|---|---|
| 2005/0193212 | A1* | 9/2005 | Yuhara | G07C 9/00309 713/186 |
| 2017/0017842 | A1* | 1/2017 | Ma | G06V 40/18 |
| 2018/0150709 | A1* | 5/2018 | Ha | H04N 23/611 |
| 2018/0170253 | A1* | 6/2018 | Park | B60K 37/06 |
| 2018/0218212 | A1* | 8/2018 | Yoshikawa | G06V 40/193 |
| 2020/0027291 | A1* | 1/2020 | Mizuno | G07C 5/008 |
| 2020/0186970 | A1* | 6/2020 | Dekovich | B60R 25/245 |

FOREIGN PATENT DOCUMENTS

EP 1510423 A1 * 3/2005 ............. B60R 25/04

* cited by examiner

*Primary Examiner* — Brandon J Miller
(74) *Attorney, Agent, or Firm* — Fox Rothschild LLP

(57) ABSTRACT

A vehicle includes: an iris sensor configured to recognize an iris of a driver and obtain iris data; an infrared camera configured to recognize a face of the driver, obtain face data, and detect an obstructive element covering at least a portion of the iris from the face of the driver; and a controller configured to perform iris authentication based on the iris data and control a lighting apparatus to change brightness of lighting in the vehicle in response to the obstructive element being detected.

20 Claims, 6 Drawing Sheets

VEHICLE AND CONTROLLING METHOD USING IRIS AUTHENTICATION

CROSS-REFERENCE TO RELATED APPLICATION

This application claims under 35 U.S.C. § 119 the benefit of Korean Patent Application No. 10-2020-0130432, filed on Oct. 8, 2020 in the Korean Intellectual Property Office, the entire contents of which are incorporated herein by reference.

BACKGROUND

1. Technical Field

The present disclosure relates to a vehicle and a controlling method, more particularly, to the vehicle and the controlling method for performing iris recognition.

2. Description of the Related Art

Currently, mass-produced vehicles may be equipped with an iris sensor to perform authentication, in addition to performing authentication through fingerprint recognition.

Since the iris sensor is a method of recognizing the pattern of an iris of a driver, recognition itself may not be possible when the driver is wearing sunglasses or glasses with high color density.

In addition, the iris sensor is arranged in a limited location due to the internal structure of the vehicle, and often has difficulty recognizing the eyes of the driver due to various factors.

SUMMARY

Therefore, it is an object of the disclosure to provide a vehicle capable of effectively performing iris authentication of a driver wearing sunglasses and a controlling method of the vehicle.

It is an aspect of the disclosure to provide a vehicle including: an iris sensor configured to recognize an iris of a driver and obtain iris data; an infrared camera configured to recognize a face of the driver, obtain face data, and detect an obstructive element covering at least a portion of the iris from the face of the driver; and a controller configured to perform iris authentication based on the iris data and control a lighting apparatus to change brightness of lighting in the vehicle in response to the obstructive element being detected.

The obstructive element may include at least one of sunglasses or tinted glasses worn by the driver.

The controller, in response to the driver wearing sunglasses or tinted glasses, may control the lighting apparatus to change the brightness of the lighting in the vehicle or control a display to generate a message notifying the driver to remove the sunglasses.

The controller may measure a distance between the iris sensor and the driver, and perform iris authentication through the iris sensor in response to the iris sensor being located at a predetermined distance (i.e., a distance capable of recognizing the iris).

The controller may measure a distance between the iris sensor and the driver, and control a seat adjustment apparatus in response to the iris sensor not being located at the predetermined distance.

The controller, in response to the iris sensor not being covered by a steering wheel, may perform iris authentication through the iris sensor.

The controller, in response to the iris sensor being covered by the steering wheel, may control a steering wheel adjustment apparatus so that the location of the steering wheel is adjusted.

The controller, in response to the location of the steering wheel being changed and the iris sensor detecting the iris of the driver, may perform iris authentication.

The controller may activate a start button of the vehicle in response to ON input of the driver, and complete the starting of the vehicle in response to iris authentication being completed by the iris sensor.

The controller may control the seat adjustment apparatus and the steering wheel adjustment apparatus so that a seat and a steering wheel are restored to their original locations in response to iris authentication being completed by the iris sensor.

It is an aspect of the disclosure to provide a controlling method of a vehicle, the method including: recognizing an iris of a driver and obtaining iris data; recognizing a face of the driver, acquiring face data, and detecting an obstructive element covering at least a portion of the iris from the face of the driver; and performing iris authentication based on the iris data, and controlling a lighting apparatus to change the brightness of the lighting in the vehicle in response to the obstructive element being detected.

The obstructive element may include at least one of sunglasses or tinted glasses worn by the driver.

The controlling method of a vehicle according to an embodiment may further include controlling the lighting apparatus to change the brightness of the lighting in the vehicle in response to the driver wearing sunglasses or tinted glasses, or controlling a display to generate a message notifying the driver to remove the sunglasses.

The controlling method of a vehicle according to an embodiment may further include measuring a distance between the iris sensor and the driver, and performing iris authentication through the iris sensor in response to the iris sensor being located at a predetermined distance (i.e., a distance capable of recognizing the iris).

The controlling method of a vehicle according to an embodiment may further include measuring a distance between the iris sensor and the driver, and controlling a seat adjustment apparatus in response to the iris sensor not being located at a predetermined distance (i.e., a distance capable of recognizing the iris).

The controlling method of a vehicle according to an embodiment may further include performing iris authentication through the iris sensor in response to the iris sensor not being covered by the steering wheel.

The controlling method of a vehicle according to an embodiment may further include controlling a steering wheel adjustment apparatus so that a location of the steering wheel is adjusted in response to the iris sensor being covered by the steering wheel.

The controlling method of a vehicle according to an embodiment may further include performing iris authentication in response to the location of the steering wheel being changed and the iris sensor detecting the iris of the driver.

The controlling method of a vehicle according to an embodiment may further include activating a start button of the vehicle in response to ON input of the driver, and completing a starting of the vehicle in response to iris authentication being completed by the iris sensor.

The controlling method of a vehicle according to an embodiment may further include controlling the seat adjustment apparatus and the steering wheel adjustment apparatus so that a seat and a steering wheel are restored to their original locations in response to the iris authentication being completed by the iris sensor.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
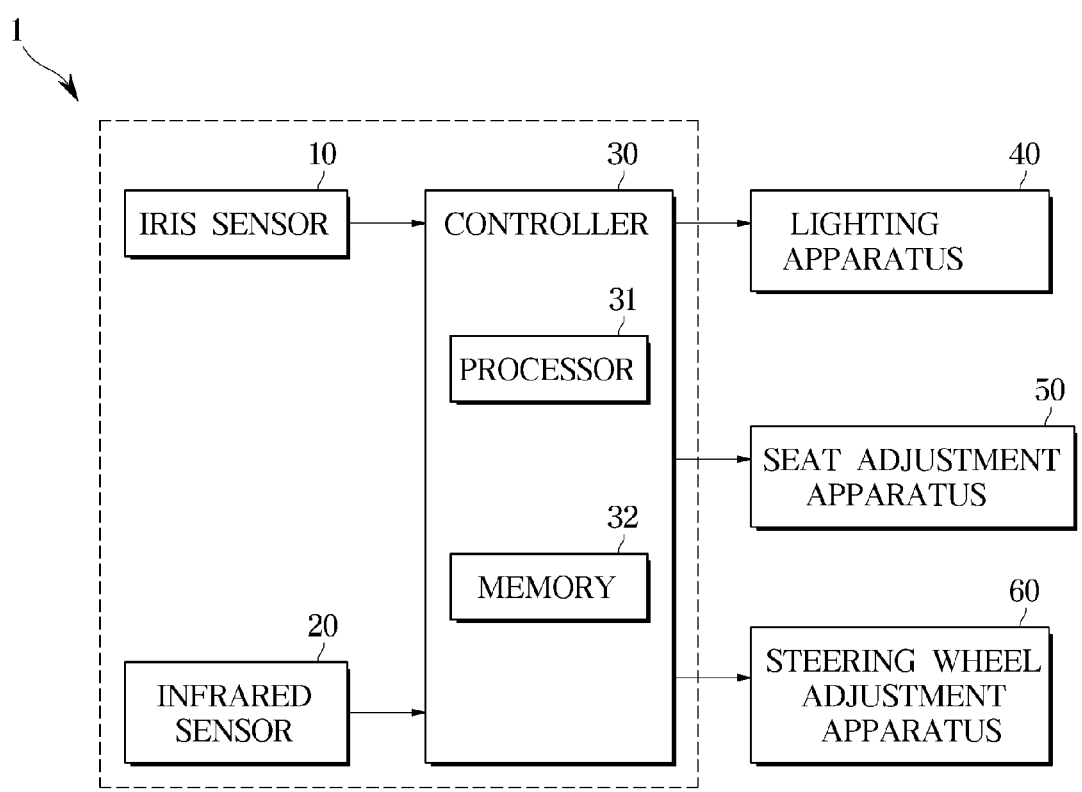
FIG. 1 is a control block diagram of a vehicle according to an embodiment.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles. The terminology used herein is for the purpose of describing particular embodiments only and is not intended to be limiting of the disclosure.

As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Like numerals refer to like factors throughout the specification. Not all factors of embodiments of the present disclosure will be described, and description of what are commonly known in the art or what overlap each other in the embodiments will be omitted.

It will be further understood that the term "connect" or its derivatives refer both to direct and indirect connection, and the indirect connection includes a connection over a wireless communication network.

In the specification, it should be understood that, when a member is referred to as being "on/under" another member, it can be directly on/under the other member, or one or more intervening members may also be present.

The terms including ordinal numbers like "first" and "second" may be used to explain various components, but the components are not limited by the terms. The terms are only for distinguishing a component from another.

Reference numerals used for method steps are just used for convenience of explanation, but not to limit an order of the steps. Thus, unless the context clearly dictates otherwise, the written order may be practiced otherwise.

Hereinafter, the operating principles and embodiments of the present disclosure will be described with reference to the accompanying drawings.

FIG. 1 is a control block diagram of a vehicle according to an embodiment.

A vehicle 1 according to an embodiment includes an iris sensor 10 for photographing an iris of a driver, an infrared sensor 20 for photographing a face of the driver, and a controller 30 for controlling a lighting apparatus 40, a seat adjustment apparatus 50, and a steering wheel adjustment apparatus 60.

The iris sensor 10 senses the iris of the driver so that the controller 30 performs authentication based on the pattern of the iris of the driver.

The iris sensor 10 may be installed at various locations inside the vehicle to photograph the iris of the driver. For example, the iris sensor 10 may be installed in various locations such as an upper side of a windshield glass, an A pillar area inside a vehicle, a cluster, a sun visor, and a room mirror. The iris sensor 10 is installed at the lower or upper end of the cluster, and may recognize the iris of the driver in a direction parallel to the face of the driver.

The infrared sensor 20 may be installed at various locations inside the vehicle to photograph the face or the driver. The infrared sensor 20 may obtain data for determining whether the driver wears sunglasses or tinted glasses by photographing the face of the driver. Like the iris sensor 10, the infrared sensor 20 may be installed in various locations such as the upper side of the windshield glass, the A pillar area inside the vehicle, the cluster, the sun visor, and the room mirror. In addition, the infrared sensor 20 may be installed together with the iris sensor 20 at the bottom or top of the cluster to be implemented in an integrated form.

The controller 30 may control at least one of the lighting apparatus 40, the seat adjustment apparatus 50, and the steering wheel adjustment apparatus 60 based on data (iris information and information on whether or not to wear sunglasses) obtained by the iris sensor 10 and the infrared sensor 20.

Specifically, the controller 30 may determine whether the driver wears sunglasses through the infrared sensor 20 and control the lighting apparatus 40 to induce the driver to take off the sunglasses.

For example, the controller 30 may allow the driver to recognize that he or she is wearing sunglasses by controlling the lighting apparatus 40 to adjust the brightness of the cluster or the brightness of the ambient light.

In addition, the controller 30 may allow the driver to recognize that he or she is wearing sunglasses by adjusting the brightness of the AVN device (not shown) or the center display (not shown). In addition to the brightness of the cluster and the ambient light. In addition, although not shown in FIG. 1, the controller 30 may include a separate display (not shown) to control the display to output a message requesting the driver to take off the sunglasses.

The controller 30 controls the seat adjustment apparatus 50 and the steering wheel adjustment apparatus 60 so that the iris sensor 10 can recognize the iris of the driver in the correct direction so that the seat location and the steering wheel location are adjust and the seat location and the steering wheel location are adjusted. A detailed description of the control conditions of the seat adjustment apparatus 50 and the steering wheel adjustment apparatus 60 will be described in detail with reference to FIGS. 3 to 6 below.

The controller 30 may include at least one memory 32 in which a program for performing the above-described operation and an operation described below is stored, and at least one processor 31 for executing the stored program. In response to the controller 30 being include a plurality of memories 32 and a plurality of processors 31, the plurality of memories 32 and the plurality of processors 31 may be directly connected to one chip, or may be physically separated.

Meanwhile, the control method described below may be performed by the controller 30, that is, the at least one processor 31 and at least one memory 32 described above.

Figure 2:
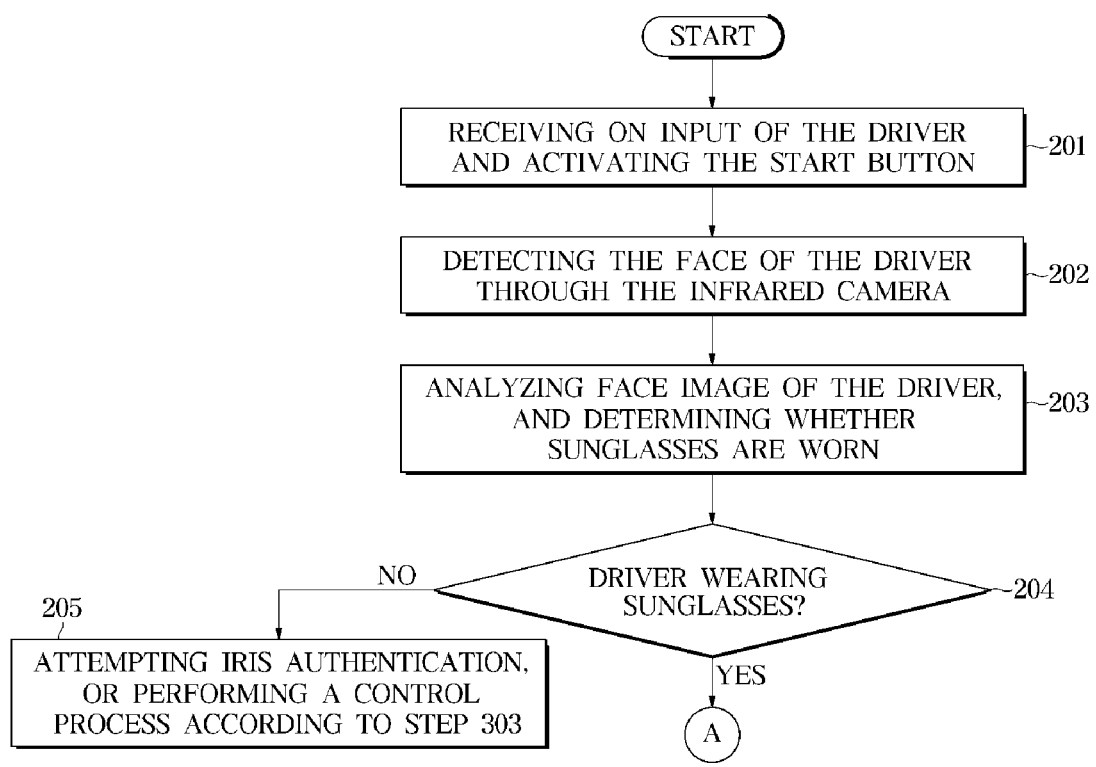
FIGS. 2 and 3 are flowcharts illustrating a controlling method of a vehicle according to an embodiment.
Figure 3:
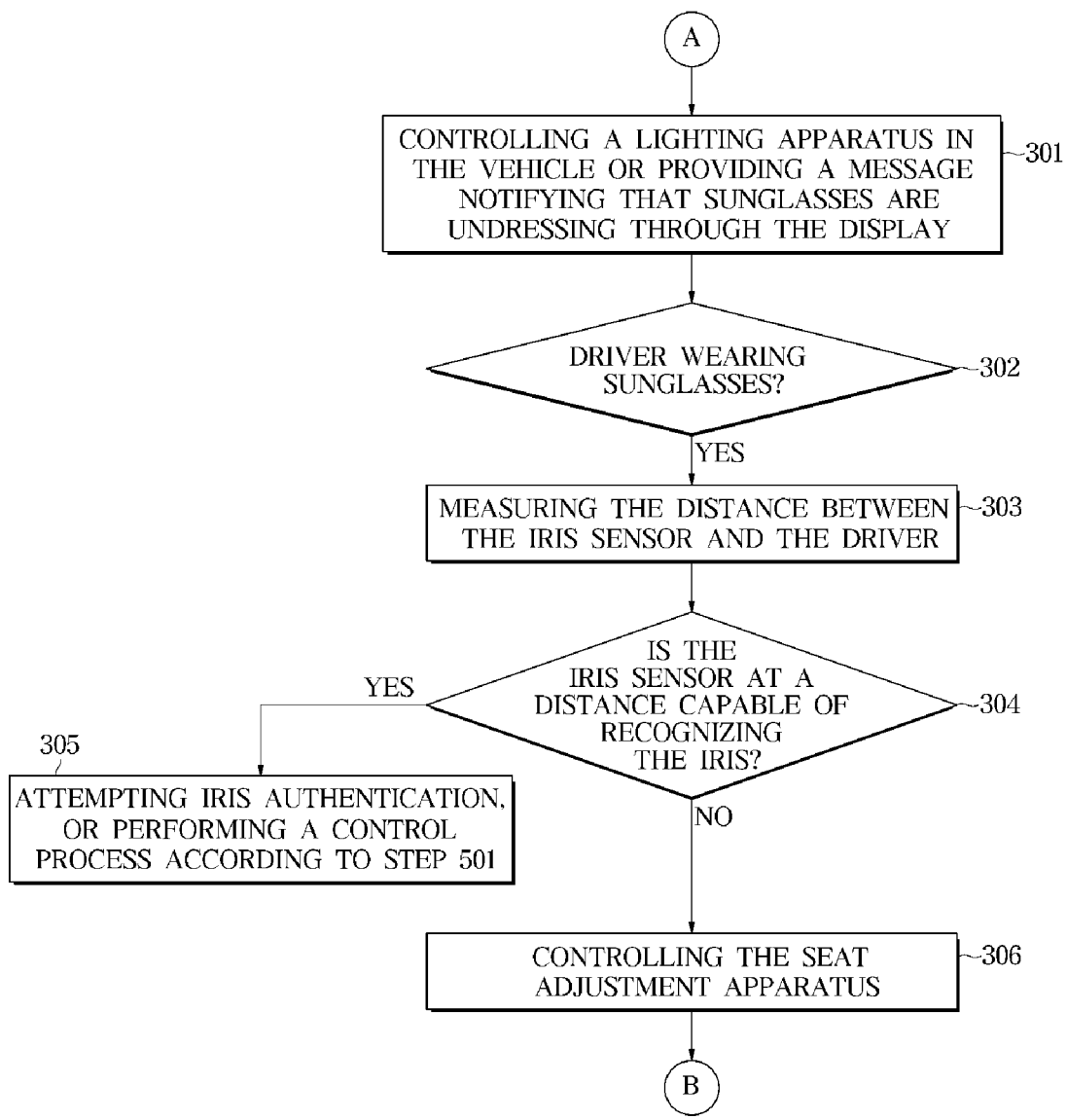
Figure 4:
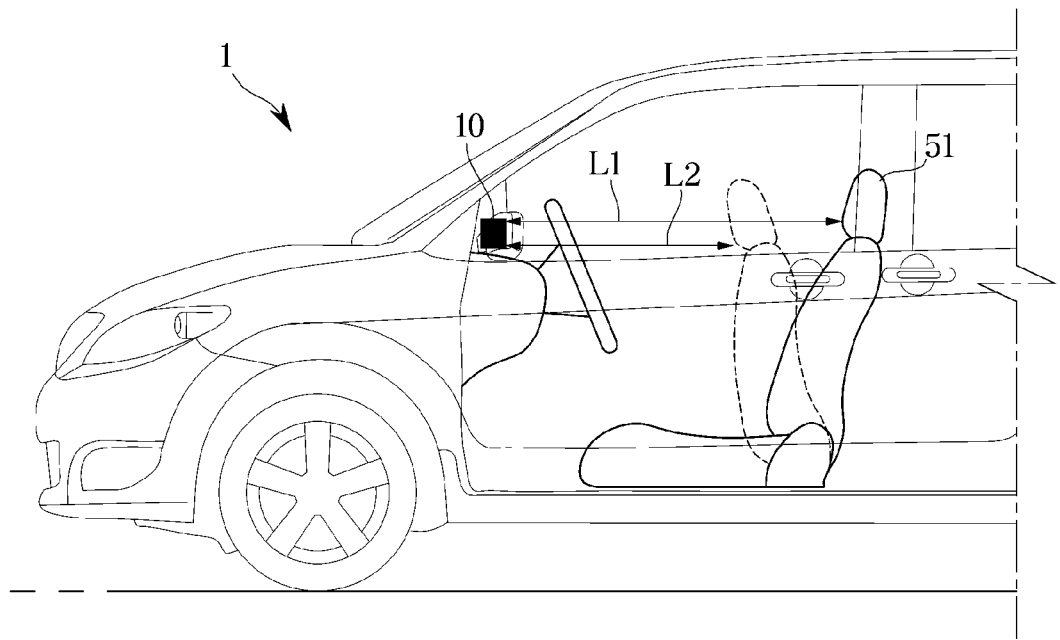
FIG. 4 is a diagram for describing FIG. 3 in more detail.

FIGS. 2 and 3 are flowcharts illustrating a controlling method of a vehicle according to an embodiment, and FIG. 4 is a diagram for describing FIG. 3 in more detail. However, this is only a preferred embodiment for achieving the object of the present disclosure, and of course, some steps may be added or deleted as needed.

The vehicle 1 receives ON input of the driver and activates the start button (201). In response to the start button being activated, the vehicle 1 controls electrical equipment belonging to the electronic system excluding the power system to be operated. For example, in response to the start button being activated, the vehicle 1 deactivates a power device (e.g., an engine or a motor), and controls the iris sensor 10 and the infrared sensor 20 for recognizing the iris and the face of the driver to be operated. Here, the power system of the vehicle 1 performs authentication of the driver's iris and may be activated after authentication is completed.

In response to the infrared sensor 20 (infrared camera) being activated, the vehicle 1 detects the face of the driver through the infrared camera (202), analyzes the facial image of the driver, and determines whether sunglasses are worn (203). In this case, the sunglasses correspond to the obstructive element covering at least a part of the iris, and the tinted glasses having a higher light blocking rate or color density than ordinary glasses may be the obstructive element in addition to the sunglasses.

The vehicle 1 may determine the wearing state of sunglasses by comparing the illumination of the periphery of the eyes of the face image of the driver and the average illumination of the entire face excluding the periphery of the eyes. For example, in response to the illumination of the periphery of the eyes being higher than the average illumination of the entire face, the vehicle 1 may be regarded as darkened by sunglasses.

In response to the driver not wearing sunglasses (204), the vehicle 1 determines that the iris sensor is sufficient to recognize the iris of the driver, and activates the iris sensor 10 to attempt iris authentication, or performs a control process according to step 303 (refer to FIG. 3) below (205).

In response to the driver wearing sunglasses 204, the vehicle 1 may provide feedback for inducing the driver to take off the sunglasses.

Referring to FIG. 3, the vehicle 1 may control a lighting apparatus in the vehicle 1 or provide a message notifying that the sunglasses should be removed through the display (301). For example, the vehicle 1 may control the lighting apparatus to adjust the brightness of the cluster in the vehicle 1 or the brightness of the ambient light so that the driver can recognize wearing sunglasses. Specifically, the vehicle 1 may significantly lower the brightness of the interior and induce the driver to remove the sunglasses.

In step 302, in response to the driver being induced to take off the sunglasses, and the driver is not wearing sunglasses (302), the vehicle 1 measures a distance between the iris sensor and the driver (303).

In response to the vehicle 1 determining that the iris sensor is at a predetermined distance at which the iris may be recognized (304) (i.e., the measured distance is less than or equal to the predetermined distance), the vehicle 1 activates the iris sensor 10 to attempt iris authentication, or performs a control process according to step 501 (see FIG. 5) below (305).

In response to the vehicle 1 being determine that the iris sensor is not the predetermined distance at which the iris can be recognized (304), the vehicle 1 may control the seat adjustment apparatus 306 to adjust the seat so that the iris of the driver is closer to the iris sensor 10.

Referring to FIG. 4, in response to a seat 51 of the vehicle 1 being separated from the iris sensor 10 by L1 and iris recognition rate being significantly low, the seat 51 may be controlled so that the distance between the iris sensor 10 and the iris of the driver becomes L2, which is a shorter distance than L1.

Although not shown in FIG. 4, the vehicle 1 may improve the iris recognition rate by adjusting the height of the floor of the seat 51 in order to maintain the horizontal level between the iris sensor 10 and the iris of the driver.

It is assumed that the iris sensor 10 according to the above-described embodiment is disposed at the bottom or top of the cluster. Accordingly, even if the iris of the driver is within a certain distance, the iris sensor 10 may not be able to recognize the iris by the steering wheel adjusted according to setting of the driver. In this case, the vehicle 1 needs to temporarily change the steering wheel adjustment so that the iris sensor recognizes the iris of the driver.

Figure 5:
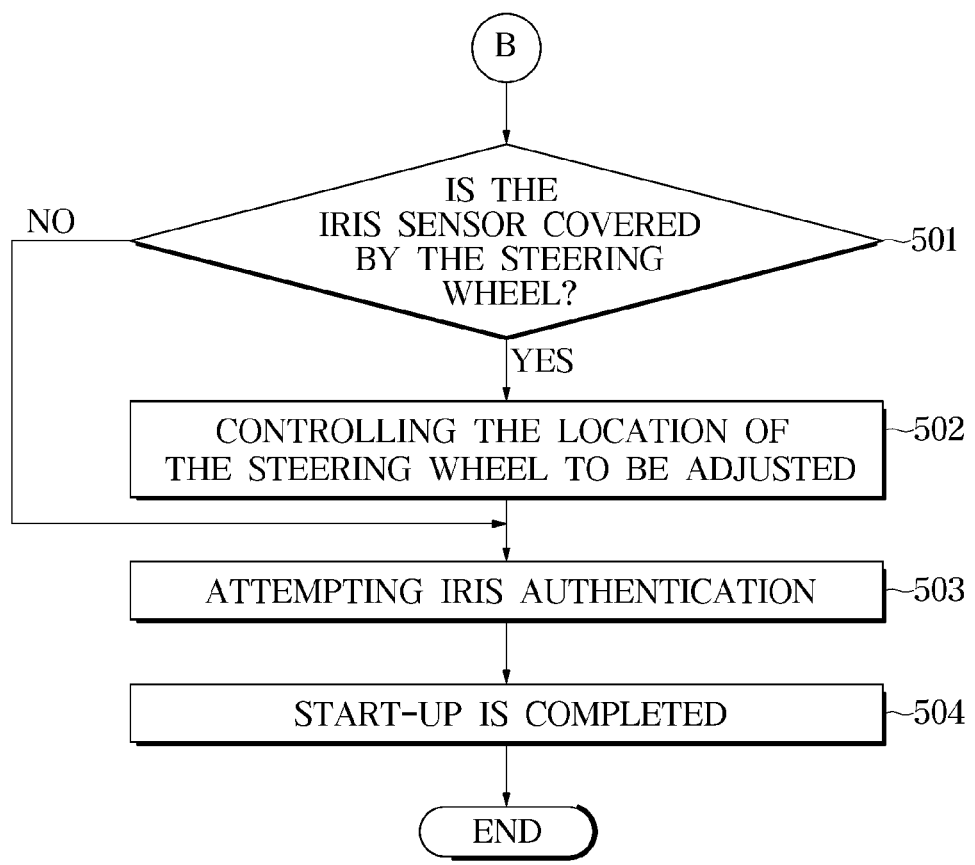
FIG. 5 is a flowchart of a controlling method of a vehicle according to an embodiment.
Figure 6:
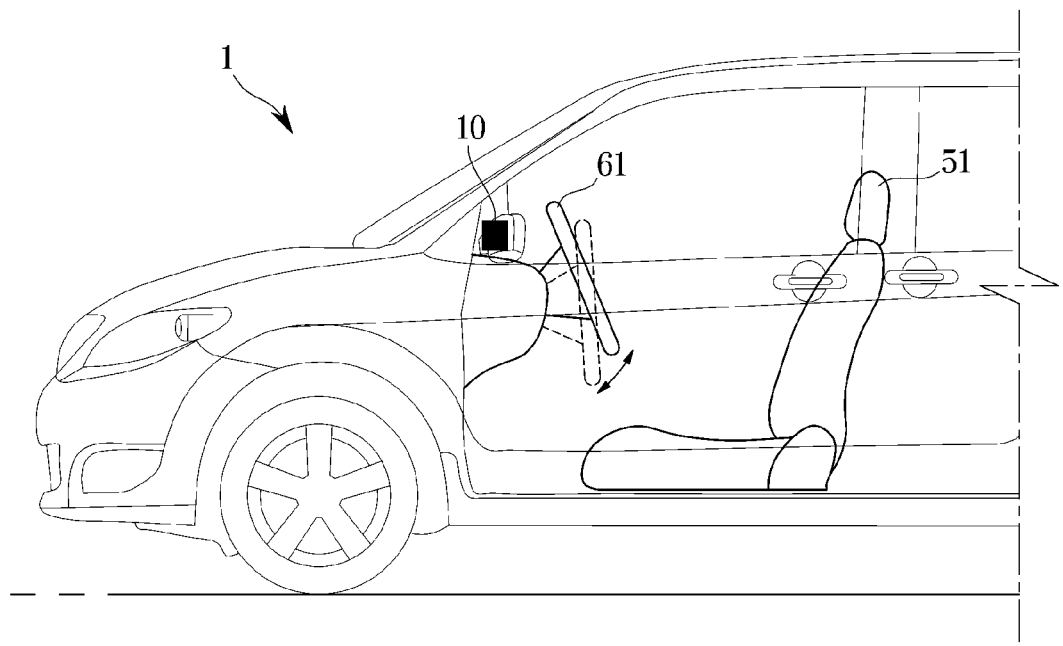
FIG. 6 is a diagram for explaining FIG. 5 in more detail.

FIG. 5 is a flowchart of a controlling method of a vehicle according to an embodiment and FIG. 6 is a diagram for explaining FIG. 5 in more detail.

However, this is only a preferred embodiment for achieving the object of the present disclosure, and of course, some steps may be added or deleted as necessary.

The vehicle 1 identifies whether the iris sensor is covered by the steering wheel (501). The iris sensor is provided at the bottom or the top of the cluster, and may detect the iris of the driver through the empty space of the steering wheel.

Accordingly, in response to the iris sensor being covered by the steering wheel and not being able to recognize the iris of the driver, the vehicle 1 controls the location of the steering wheel to be adjusted (502). Referring to FIG. 6, the steering wheel may be moved so that its location is adjusted by vertical rotation.

In step 502, in response to the iris sensor 10 being able to recognize the iris of the driver through the empty space of the steering wheel, the vehicle 1 attempts iris authentication (503), and in response to the iris of the driver being recognized as an authenticated user, the vehicle 1 controls the vehicle 1 so that the start-up is completed (504). Accordingly, in the vehicle 1, all power systems other than the electronic system are activated.

After authentication is made in step 504, in response to the electronic system and the power system of the vehicle 1 being activated, the vehicle 1 returns the locations of the seat 51 and the steering wheel 61 to the locations previously set by the user.

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which can be decoded by a computer are stored, for example, a Read Only Memory (ROM), a Random Access Memory (RAM), a magnetic tape, a magnetic disk, a flash memory, an optical data storage device, and the like.

According to an aspect of the present disclosure, effective iris authentication may be performed even when a driver wears sunglasses. In addition, it is possible to provide a high iris authentication rate even when the iris sensor is covered by an obstacle inside the vehicle.

Although embodiments of the present disclosure have been described for illustrative purposes, those skilled in the art will appreciate that various modifications, additions and substitutions are possible, without departing from the scope and spirit of the disclosure. Therefore, embodiments of the present disclosure have not been described for limiting purposes.

What is claimed is:

1. A vehicle, comprising:
   an iris sensor configured to recognize an iris of a driver to obtain iris data;
   an infrared camera configured to recognize a face of the driver to acquire face data, and detect an obstructive element covering at least a portion of the iris from the face of the driver; and
   a controller configured to:
      perform iris authentication based on the iris data; and
      control a lighting apparatus to change brightness of lighting in the vehicle in response to the obstructive element being detected;
      measure a distance between the iris sensor and the driver; and
      control a seat adjustment apparatus based on the measured distance between the iris sensor and the driver.

2. The vehicle according to claim 1, wherein the obstructive element includes at least one of sunglasses or tinted glasses worn by the driver.

3. The vehicle according to claim 2, wherein the controller, in response to the driver wearing the sunglasses or the tinted glasses, is configured to control the lighting apparatus to change the brightness of the lighting in the vehicle or control a display to generate a message notifying the driver to remove the sunglasses.

4. The vehicle according to claim 2, wherein the controller is configured to perform iris authentication through the iris sensor in response to the iris sensor being located at a predetermined distance.

5. The vehicle according to claim 2, wherein the controller is configured to control the seat adjustment apparatus in response to the iris sensor not being located at a predetermined distance.

6. The vehicle according to claim 5, wherein the controller is configured to control the seat adjustment apparatus so that a seat is restored to an original location in response to iris authentication being completed by the iris sensor.

7. The vehicle according to claim 2, wherein the controller, in response to the iris sensor not being covered by a steering wheel, is configured to perform iris authentication through the iris sensor.

8. The vehicle according to claim 2, wherein the controller, in response to the iris sensor being covered by the steering wheel, is configured to control a steering wheel adjustment apparatus so that a location of the steering wheel is adjusted.

9. The vehicle according to claim 8, wherein the controller, in response to the location of the steering wheel being changed and the iris sensor detecting the iris of the driver, is configured to perform iris authentication.

10. The vehicle according to claim 1, wherein the controller is configured to activate a start button of the vehicle in response to ON input of the driver, and complete starting of the vehicle in response to the iris authentication being completed by the iris sensor.

11. A controlling method of a vehicle, the method comprising:
    recognizing, by an iris sensor, an iris of a driver and obtaining iris data;
    recognizing, by an infrared sensor, a face of the driver, acquiring face data, and detecting an obstructive element covering at least a portion of the iris from the face of the driver;
    performing, by a controller, iris authentication based on the iris data, and controlling a lighting apparatus to change brightness of lighting in the vehicle in response to the obstructive element being detected;
    measuring, by the controller, a distance between the iris sensor and the driver; and
    controlling, by the controller, a seat adjustment apparatus based on the measured distance between the iris sensor and the driver.

12. The method according to claim 11, wherein the obstructive element includes at least one of sunglasses or tinted glasses worn by the driver.

13. The method according to claim 12, further comprising: controlling the lighting apparatus to change the brightness of the lighting in the vehicle in response to the driver wearing sunglasses or tinted glasses, or controlling a display to generate a message notifying the driver to remove the sunglasses.

14. The method according to claim 12, further comprising: performing iris authentication through the iris sensor in response to the iris sensor being located at a predetermined distance.

15. The method according to claim 12, further comprising: controlling the seat adjustment apparatus in response to the iris sensor not being located at a predetermined distance.

16. The method according to claim 15, further comprising: controlling the seat adjustment apparatus so that a seat is restored to an original location in response to iris authentication being completed by the iris sensor.

17. The method according to claim 12, further comprising: performing iris authentication through the iris sensor in response to the iris sensor not being covered by the steering wheel.

18. The method according to claim 12, further comprising: controlling a steering wheel adjustment apparatus so that a location of the steering wheel is adjusted in response to the iris sensor being covered by the steering wheel.

19. The method according to claim 18, further comprising: performing iris authentication in response to the location of the steering wheel being changed and the iris sensor detecting the iris of the driver.

20. The method according to claim 11, further comprising: activating a start button of the vehicle in response to ON input of the driver, and completing a starting of the vehicle in response to iris authentication being completed by the iris sensor.

* * * * *